April 12, 1960   A. LESNEWICH ET AL   2,932,722
ELECTRIC ARC WELDING

Filed Aug. 6, 1958   4 Sheets-Sheet 1

INVENTORS
ALEXANDER LESNEWICH
EVERETT H. CUSHMAN
BY H. Hume Mathews
Edmund W Bopp
ATTORNEY & AGENT April 12, 1960     A. LESNEWICH ET AL     2,932,722
ELECTRIC ARC WELDING Filed Aug. 6, 1958     4 Sheets-Sheet 2

INVENTORS
ALEXANDER LESNEWICH
EVERETT H. CUSHMAN
BY
H. Hume Matthews
Edmund W Bopp
ATTORNEY & AGENT April 12, 1960 A. LESNEWICH ET AL 2,932,722
ELECTRIC ARC WELDING
Filed Aug. 6, 1958 4 Sheets-Sheet 3

INVENTORS
ALEXANDER LESNEWICH
EVERETT H. CUSHMAN
BY
H. Hume Mathews
Edmund W Bopp
ATTORNEY & AGENT April 12, 1960 A. LESNEWICH ET AL 2,932,722
ELECTRIC ARC WELDING
Filed Aug. 6, 1958 4 Sheets-Sheet 4

INVENTORS
ALEXANDER LESNEWICH
EVERETT H. CUSHMAN
BY
ATTORNEY & AGENT

United States Patent Office 2,932,722
Patented Apr. 12, 1960

2,932,722

ELECTRIC ARC WELDING

Alexander Lesnewich, New Providence, and Everett H. Cushman, South Plainfield, N.J., assignors to Air Reduction Company, Incorporated, New York, N.Y., a corporation of New York Application August 6, 1958, Serial No. 753,490

19 Claims. (Cl. 219—74)

This invention relates to consuming electrode electric arc welding of ferrous materials in a shielding atmosphere of carbon dioxide.

The oxidizing gas carbon dioxide has been suggested, and is being used, for the shielding of the consumable electrode welding arc. See, among others, Mikhalapov United States Patent No. 2,544,711, issued March 13, 1951. For the welding of steel, carbon dioxide is a relatively non-reactive gas and it has proved to be a satisfactory medium for the exclusion of air from the vicinity of the weld. However, a major and almost fatal disadvantage of $CO_2$ gas shielding is that the transfer of metal from the electrode to the work is globular in form and random in direction, causing the arc to be wild and unstable and the gas shield to be disrupted. The process is, therefore, characterized by the production of considerable spatter which adheres to the work and builds up in the shielding gas nozzle.

Accordingly, it is highly desirable, and has long been an objective in the art, to provide a carbon dioxide shielded consumable electrode arc welding process in which axial spray type transfer of metal from the electrode to the workpiece is achieved. This spray transfer consists of a succession of discrete metal droplets projected axially from the electrode to the workpiece. In addition to the welding operational advantages of this type of transfer, spray transfer performs the important function of providing a mechanism for getting the molten metal across the arc from the electrode tip to the work without causing arc instability or short circuiting and without disturbing the shielding gas envelope. It provides a smooth, steady, stable, spatter-free arc in which the vaporized and molten weld metal is at all times shielded from the ambient air by a continuous, undisturbed stream of shielding gas.

Inert gas shielded consumable electrode spray transfer arc welding, utilizing reverse polarity, high current density, and an arc shield of an inert gas such as argon, is now well known and in widespread commercial use. Such welding process, which is disclosed in Muller et al. United States Patent 2,504,868, is characterized by the high quality welds that can be produced with it in any metal and in any position. The success of the process can be attributed in part to the novel combination of elements which interact to produce the "spray transfer" of metal from the electrode to the work.

High quality spray transfer type welding has also been achieved, for the welding of all metals in all positions, in straight polarity and alternating current inert gas shielded consumable electrode welding. Such welding processes, as disclosed and claimed in the Muller Patents Nos. 2,694,763 and 2,694,764, involve the addition to the electrode, operated as the arc cathode, of addition compounds which dissociate in the inert shielding atmosphere to produce elements that cooperate with the metal of the cathode and the inert gas in the shielding atmosphere to produce the spray transfer phenomenon.

It has been suggested, broadly, that addition compounds be added to the $CO_2$ shielded arc. However, the electrical and chemical conditions existing in the $CO_2$ shielded arc are entirely different than those existing in the argon (inert) gas shielded arc; this probably explains the fact that an agent which will produce spray in the inert gas shielded arc may produce no beneficial effect whatsoever on metal transfer in an oxidizing atmosphere such as carbon dioxide. This is probably not illogical because, although there may on first impression appear to be a similarity, the cathode environment of the inert gas shielded arc is significantly different from the cathode environment in the oxidizing $CO_2$ atmosphere. Practically any metallic compound when exposed to the extremely high temperatures in the region of the welding arc, dissociates, releasing a positive metal ion. In an inert atmosphere the concentration of uncombined metal ions is believed to be high because in such a non-reactive atmosphere the equilibrium at high temperatures favors high concentrations of uncombined atoms and ions. This makes possible the formation of the highly emissive composite cathode surface disclosed in the aforesaid Muller patents when the proper metals are present. The elemental film of addition metal on the base metal, when the addition metal is properly selected from the alkali, alkaline earth or rare earth groups, lowers the work function and increases surface emissivity at the proper location on the cathode. But when the arc is shielded by an oxidizing atmosphere such as $CO_2$, the equilibrium is directed to a much greater extent toward the formation of oxides and consequently there are believed to be present on the cathode metal a much greater quantity of metal oxides and fewer uncombined metal atoms or ions. Such a situation appears, in retrospect, to be one of the reasons why spray producing agents that are highly effective and entirely satisfactory in inert atmospheres are completely ineffective to produce spray transfer in $CO_2$.

Whatever the reason, it has not been possible, prior to the present invention, to produce spatter-free weld deposits with an axial spray type consuming electrode arc shielded with carbon dioxide.

An object of this invention, therefore, is to provide a method of welding in carbon dioxide, in which the metal transfer from the electrode to the work is spray in character.

Another object is to provide a method of carbon dioxide shielded arc welding with normal arc lengths (non-submerged arcs) that is substantially free of spatter.

Another object is to provide a method of welding in a carbon dioxide atmosphere in which the arc is stable and the metal transfer quiet to thereby avoid disruption of the carbon dioxide shield to prevent entrainment of air in the shield gas; particularly, it is an object to provide a method which will effect such result and produce sound weld deposits with ferrous electrodes containing relatively large quantities of deoxidizing or reducing elements such as Si, Al and Ti.

A very important object of the invention is to provide a novel, specially treated consumable ferrous metal electrode having the proper metallurgical composition to produce sound welds in rimmed and semi-killed steels, which, when used with current densities of the order of magnitude disclosed in Muller et al. Patent No. 2,504,868, will produce spray type metal transfer from the electrode to the workpiece when the arc is shielded with the oxidizing gas carbon dioxide.

These and other objects and advantages of the invention will be pointed out or will become apparent from the following description:

According to the present invention a cesium compound (preferably an oxygen bearing cesium compound) in admixture or combination with an alkali metal compound which coacts therewith to produce a synergistic effect is introduced to the cathode of a straight polarity carbon dioxide shielded consumable electrode welding arc. This preferably is accomplished by the addition of a superficial coating or film of a certain synergistic mixture of compounds to the surface of the electrode wire. In general, it has been found according to the invention that if such a synergistic mixture of the cesium compound plus an adjuvant compound is applied to a ferrous electrode wire in a quantity such that the cesium in the mixture is present in an amount by weight which is at least about 0.01% of the total weight of the electrode, a spatter-free axial spray transfer can be produced in the oxidizing carbon dioxide atmosphere with straight polarity at a current level well within the most desirable range for practical welding. The resulting weld is free of nitrides and oxide inclusions. By proper deoxidation practice, controlled principally by the chemistry of the electrode wire, sound welds substantially free of porosity and inclusions can be produced in virtually all types of ferrous materials, including rimmed, semi-killed, and killed steels, low alloy steels, stainless and heat resistant steels, etc.

The presence of deoxidizing elements (such as silicon, aluminum and titanium) one or more of which are normally incorporated along with manganese in consumable ferrous electrode wires, and which normally are present in relatively large amounts (in excess of 0.25%) in ferrous wires used for the welding of rimmed or semi-killed steels, have been found to affect adversely the spray producing action of cesium in $CO_2$ shielded arc welding, though they have no such effect in inert gas shielded metal arc welding.

Further, the fact that $CO_2$ gas has a relatively high plasma voltage drop, as compared to inert gases such as argon, tends to prevent the establishment and continuous maintenance of the electrical and chemical conditions that result in spray type metal transfer. These difficulties, as well as the difficulty caused by the oxidizing character of carbon dioxide, have now been overcome, however, by the present invention, through the utilization of a unique combination of carbon dioxide shielding gas, straight polarity high current density welding current, and a specially treated ferrous electrode alloy composition. Such novel combination of process steps and conditions has been discovered according to the present invention consistently to produce high quality, commercially acceptable, sound welds in ferrous workpieces, including rimmed and semi-killed workpieces, with the highly desirable spray transfer metal arc that heretofore was known only in the inert gas shielded welding processes.

For a more complete understanding of the invention reference should be made to the following detailed description and the accompanying drawings in which.

Figure 1:
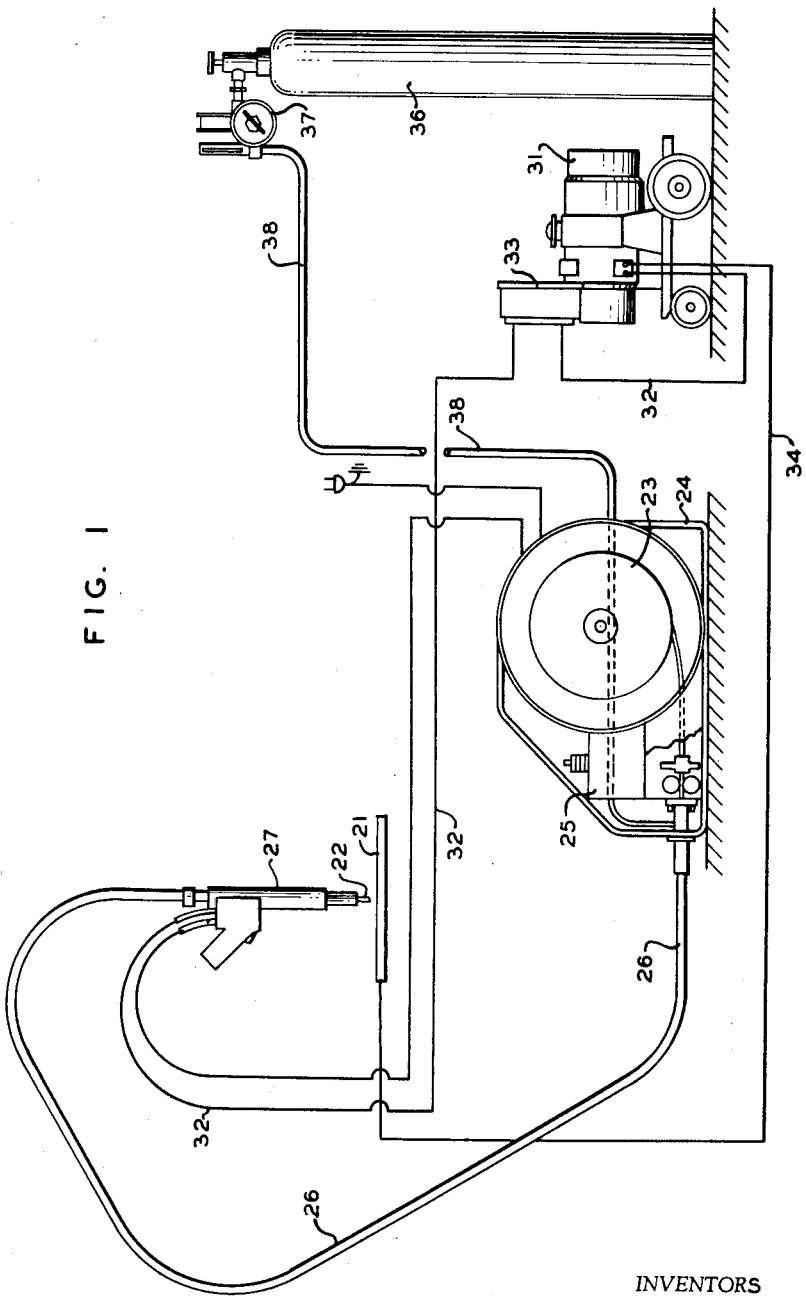
Figure 1 illustrates diagrammatically an apparatus suitable for the practice of the invention.

Referring to Figure 1, the work or plate to be welded is designated by the reference number 21. A welding electrode 22 is preferably supplied in the form of a long length of wire dispensed from a reel 23 mounted within a frame 24. Motor driven feed mechanism 25 withdraws the wire from the reel and pushes it continuously at a selected feed rate equal to the electrode burn-off rate through a flexible casing 26 to a welding gun 27. The wire reel and reel support and the feed mechanism may be of the type disclosed in Anderson U.S. Patent No. 2,681,401 issued June 15, 1954. The flexible casing and the welding gun may be of the type disclosed in Anderson U.S. Patent No. 2,659,796 issued November 17, 1953. Welding current is supplied to the electrode 22 from a contact element within the gun 27, from a direct current welding power supply 31 through conductor 32. A power operated switch or contactor 33 is interposed in conductor 32 to interrupt the welding current as required. The welding circuit is completed by a conductor 34, connecting the other terminal of the welding power supply 31 to the work 21. The shielding gas, carbon dioxide, is supplied from any suitable source such as a cylinder 36, through a pressure regulator 37 and conduit 38, to an appropriate passage in the flexible casing 26, for delivery to the welding gun 27. The shielding gas is preferably discharged from the welding gun 27 as a non-turbulent flow stream enveloping the arcing end of the electrode, the arc and the weld pool on the work produced by the arc. Apparatus suitable for the practice of the present invention, such as the apparatus disclosed in Figure 1, is conventional gas shielded arc welding apparatus and is now well known.

The preferred method of introducing the spray producing agent to the arc in the present invention is by a superficial addition to the surface of an otherwise bare wire electrode. Such an addition may be made to the wire by first preparing the wire surface in a suitable manner to receive the agent and then passing the wire so prepared through a solution or slurry of the spray producing agent.

Figure 2:
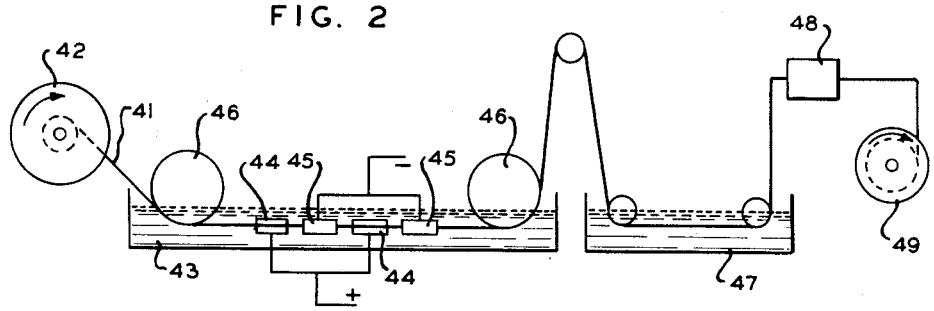
Figures 2 and 3 illustrate diagrammatically apparatus for preparing the electrode wire for the application thereof of a spray producing agent.
Figure 3:
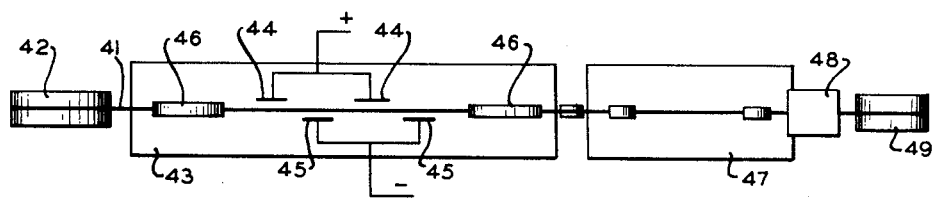

Figures 2 and 3 schematically illustrate suitable apparatus for electrolytically cleaning the electrode wire to prepare its surface for the application of the spray producing agent. In this cleaning process the electrode wire 41 is drawn from a supply reel 42 into an acid bath 43. The wire is guided through the bath between electrodes 44, 45 by guide rolls 46. A suitable acid bath may consist of 4 pounds of chromium trioxide and 3 pounds of sulphuric acid dissolved in 7 gallons of water. Direct current of a strength of about 100 amperes is conducted through the bath between electrodes 44 and electrodes 45. Following this, the wire passes into a clear water rinse 47 and is thereafter thoroughly dried in a dryer 48 before being respooled on a reel 49. The wire may be drawn through the electrolytic acid cleaning system at a rate of about 250 inches per minute. This cleaning process leaves the wire surface substantially free of all foreign matter and impurities that might otherwise interfere with the application of the spray producing agent to the wire surface.

Figure 4:
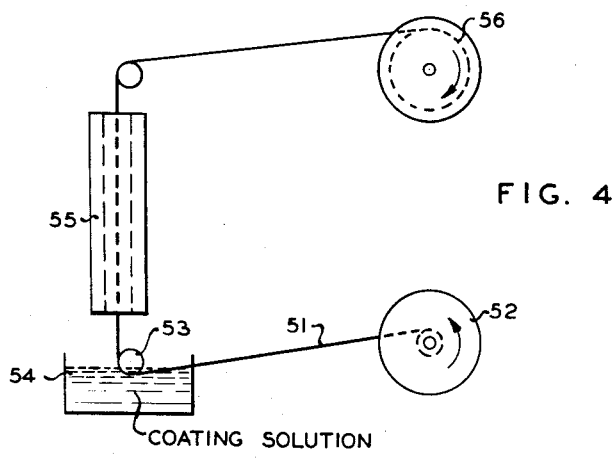
Figure 4 illustrates diagrammatically suitable apparatus for the application of the spray producing agent to the welding wire.

Following the wire preparation described above or some other equivalent process which will produce a surface capable of being wet uniformly by a solution of the spray producing agent, the wire is drawn through such a solution to apply a small quantity of spray producing agent to the surface of the wire. A suitable form of apparatus for applying spray producing agent to the wire is illustrated in Figure 4. In this figure, the wire 51 is withdrawn from a supply reel 52 and passed over a guide roll 53 partially submerged in a bath 54 of the spray producing agent. The specific composition of the spray producing agent bath will be more fully described hereinafter. As the wire 51 emerges from the bath it passes through a dryer 55 from which it is guided onto a take-up reel 56. This reel 56 is preferably adapted to be used as the wire supply reel 23 in the wire feed apparatus of Figure 1. Many of the suitable spray producing agents are water soluble and in the simplest application the bath 54 is a water solution. Other solvents may of course be used where appropriate. It has been found that the uniformity of distribution of the spray producing agent on the wire is improved if a wetting agent is added to the bath. Any one of a number of commercially available wetting agents is suitable. With a water solution of the order of from 50 to 150 grams of compounds per liter of water, a satisfactory distribution of spray producing agent can be obtained on the wire surface by drawing the wire through the solution with the equipment described above, at a rate of about 250 inches per minute. Obviously other equivalent means may be employed for applying the spray producing agent to the electrode wire without departing from the teaching of the present invention.

The most important element in the preparation of the wire is the selection of the spray producing agent to be applied to the wire. In accordance with the present invention a synergistic mixture of a cesium compound and another alkali metal compound when applied to the electrode wire in the manner described above, acts to produce spray transfer with straight polarity in a carbon dioxide atmosphere that is comparable in character to that obtained with reverse polarity in an argon atmosphere. The alkali metals are cesium, sodium, potassium, rubidium, lithium and francium. The preferred compounds are the oxygen containing compounds such as hydroxides, carbonates and nitrates. Such preferred compounds have been found to produce the advantages provided by the invention more readily and to a greater extent than other compounds.

Examples of particular spray producing agents that have been found to perform well along with the welding conditions for operation at a current level just above transition from drop to spray are set forth in Table I. The nominal composition of each of the electrode wires referred to in Table I is as follows:

Wire A:

| | Percent |
|---|---|
| C | 0.10 |
| Mn | 0.95 |
| Si | 0.45 |
| P | 0.015 |
| S | 0.020 |

Wire B:

| | Percent |
|---|---|
| C | 0.093 |
| Mn | 1.97 |
| Si | 0.76 |
| P | 0.015 |
| S | 0.020 |

Wire C:

| | |
|---|---|
| C | 0.06 |
| Mn | 1.12 |
| Si | 0.36 |
| P | 0.025 |
| S | 0.017 |
| Cr | 0.14 |
| Mo | 0.41 |
| Ni | 1.24 |
| V | 0.15 |

In each of the examples of Table I the wire was electrolytically cleaned prior to the application of the spray producing agent in exactly the manner heretofore described. The spray producing agent was then applied in the manner described and illustrated herein. Table I discloses the number of grams of each compound dissolved in sufficient water to produce one liter of solution. In each of the examples in Table I a good axial spray transfer, comparable to that obtained with reverse polarity in argon, was achieved in a $CO_2$ atmosphere. Preferred spray producing agents are mixtures of $Cs_2CO_3$ and $Na_2CO_3$, $Cs_2CO_3$ and $K_2CO_3$,

*Table I*

| Example No. | Wire Composition | Wire Diameter | Spray Producing Agent (grams of compound per liter of solution) | Current in Amperes (direct current straight polarity) | Arc Voltage (⅛″ arc length) | Wire Feed Speed (inches per minute) | Shielding Gas (Delivered at 25 c.f.h. through ¾″ nozzle) | Type of Transfer |
|---|---|---|---|---|---|---|---|---|
| 1 | A | .063 | 40 $Cs_2CO_3$+16 $K_2CO_3$ | 310 | 33 | 145 | $CO_2$ | Axial Spray. |
| 2 | A | .063 | 80 $Cs_2CO_3$+40 $Na_2CO_3$ | 285 | 29.5 | 125 | $CO_2$ | Do. |
| 3 | A | .063 | 40 $Cs_2CO_3$+20 $Na_2CO_3$ | 280 | 30 | 130 | $CO_2$ | Do. |
| 4 | B | .063 | 80 $Cs_2CO_3$+26 $Na_2CO_3$ | 300 | 30 | 145 | $CO_2$ | Do. |
| 5 | B | .063 | 80 $CsNO_3$+35 $NaNO_3$ | 310 | 31 | 150 | $CO_2$ | Do. |
| 6 | A | .045 | 40 $Cs_2CO_3$+40 $Rb_2CO_3$ | 205 | 29 | 220 | $CO_2$ | Do. |
| 7 | A | .045 | 40 $Cs_2CO_3$+40 $Na_2CO_3$ | 200 | 28.5 | 205 | $CO_2$ | Do. |
| 8 | A | .063 | 40 $Cs_2CO_3$+9 $Li_2CO_3$ | 330 | 33.5 | 160 | $CO_2$ | Do. |
| 9 | C | .063 | 40 $Cs_2CO_3$+40 $Rb_2CO_3$ | 300 | 32 | 150 | $CO_2$ | Do. |
| 10 | A | .063 | 40 CsOH+11 NaOH | 305 | 31 | 140 | $CO_2$ | Do. |
| 11 | A | .063 | 40 CsOH+15 KOH | 300 | 31.5 | 140 | $CO_2$ | Do. |
| 12 | A | .063 | 40 CsOH+14 $Na_2CO_3$ | 305 | 32 | 230 | $CO_2$ | Do. |

Note.—All welds made on ½″ semi-killed steel plate at a travel speed of 15 inches per minute, using an electrode terminal portion of ⅝″.

CsOH and NaOH, CsOH and KOH, and $CsNO_3$ and $NaNO_3$. In general, it is preferred to use oxygen bearing compounds of cesium in admixture with a similar compound of Na or K. Francium is believed to be of little practical value because it is radioactive and extremely rare and expensive.

It has been observed that when the compounds are mixed in certain proportions, the performance is superior. A study of the data developed during extensive testing of this invention revealed that the current at which the transition takes place from drop to spray transfer is minimum when the two compounds are present in a ratio such that there is a substantially equal number of cesium atoms and atoms of the other alkali metal present in the solution. For example, in a mixture of $Cs_2CO_3$ and $Na_2CO_3$ or in a mixture of CoOH and NaOH, the cesium and sodium are in equal atomic proportions, one Cs atom for each atom of Na, when the weights of the compounds are in the same ratio in the mixture as the ratio of their molecular weights. If, on the other hand, the mixture selected is, for instance, a mixture of CsOH and $Na_2CO_3$ the minimum transition current appears to occur when there are twice as many molecules of CsOH as molecules of $Na_2CO_3$. This is supported by the test data recorded in Table II which shows the change in the current at which transition from drop to spray transfer occurs as the weight of the other alkali metal compound is varied with respect to the weight of cesium compound in a manner to provide (1) half as many, (2) an equal number, and (3) one and a half times as many atoms of the other alkali metal as there are present atoms of cesium.

cesium to provide consistently satisfactory commercially acceptable results.

It seems quite clear from the experimental evidence that cesium is an essential element to the production of spray transfer in carbon dioxide. In certain instances, Table II

| Composition of Spray Producing Agent | Transition Current when each compound in the mixture is present in an amount to provide ½ as many other alkali metal atoms as atoms of Cs | Transition Current when each compound in the mixture is present in an amount to provide equal number of Cs atoms as atoms of other alkali metal | Transition Current when each compound in the mixture is present in an amount to provide 1½ times as many other alkali metal atoms as atoms of Cs |
|---|---|---|---|
| $Cs_2CO_3 + Na_2CO_3$ | 325 | 295 | 305 |
| $Cs_2CO_3 + Rb_2CO_3$ | 320 | 305 | 325 |
| $Cs_2CO_3 + K_2CO_3$ | 330 | 315 | 350 |
| $CsOH + NaOH$ | 330 | 305 | 310 |
| $CsOH + KOH$ | 325 | 300 | 345 |
| $CsCl + NaCl$ | 350 | 340 | 370 |
| $CsOH + NaCO_3$ | 330 | 305 | 315 |

Figure 5:
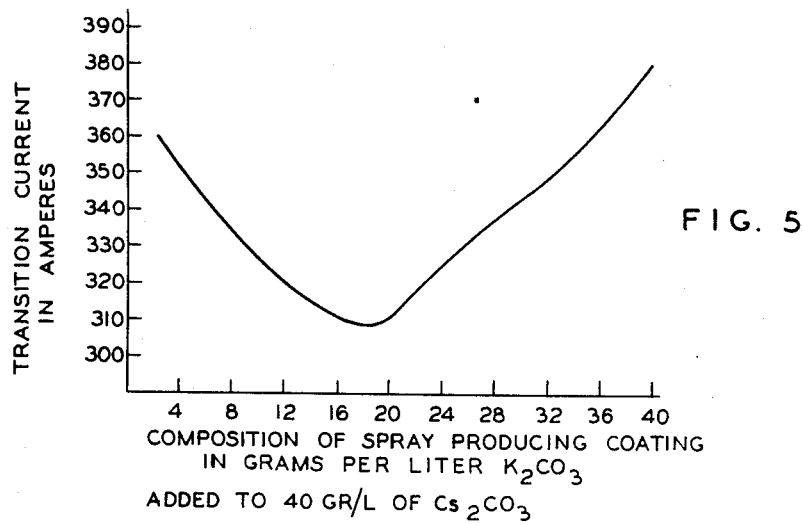
Figure 5 is a graphical representation of the variations in the current level at which the transition from drop to spray transfer takes place as the proportions of Cs and K in a particular spray producing agent composition are altered throughout a range of mixtures.

Reference should be made to Figure 5 for an example of the way in which the transition current varies as the proportions of cesium and other alkali metal atoms vary. In Figure 5 the transition current level at which metal transfer changes from drop to spray is plotted against grams of $K_2CO_3$ per liter of solution in which there is a constant 40 grams per liter of $Cs_2CO_3$. The data on which this curve is based have been derived experimentally. From this figure it can be seen that the minimum transition current occurs when the $K_2CO_3$ content of the solution is between 16 and 20 grams per liter. A calculation based on the atomic weights of the elements reveals that an equal number of cesium of potassium atoms are present when there is 40 grams of $Cs_2CO_3$ and 17 grams of $K_2CO_3$. While good results can be obtained with ratios of metal atoms which vary from the optimum ratio of 1:1, it is preferred that such ratios be kept within the limits of from 5:1 to 1:5 (while at the same time maintaining the amount of cesium present above a minimum of about .01% by weight of the electrode), in order to provide the benefits of the teaching herein with respect to the proportions of compounds in the mixture.

It has been found according to the present invention that spray transfer can be produced in a carbon dioxide atmosphere when a spray producing agent consisting of a synergistic mixture of a cesium compound and an adjuvant alkali metal compound is employed. The unique synergistic action of the addition mixtures of the present invention has been shown by tests which indicate that addition agents other than alkali metal compounds are not effective as an adjuvant material with a cesium compound to form a $CO_2$ spray producing agent. Examples of such compounds other than alkali metal compounds that were tested and found to be ineffective for the purpose are $MgCl_2$, $Mg(NO_3)_2$, $Mn(NO_3)_2$, $Fe(NO_3)_2$, $Ni(NO_3)_2$, $SnCl_2$, $BaCl_2$, $CaCl_2$, $La(NO_3)_3$, $Ce_2O_3$, etc. In no instance was spray transfer obtainable with any of these compounds when used alone or when used in combination with a cesium compound. Tests employing only alkali metal compounds other than cesium and combinations of alkali metal compounds other than cesium gave similar negative results. For instance, using a combination of $Rb_2CO_3$ and $Na_2CO_3$ no spray transfer could be obtained with currents up to 530 amperes. A combination of RbOH and KOH at a current of about 370 amperes resulted in some effect on the arc but actual spray transfer was not produced. Most all alkali, alkaline earth and rare earth metal compounds produce a depression of the burn-off rate in a $CO_2$ shielded metal arc for a given current at straight polarity, but none except cesium appear to be capable of producing axial spray transfer in oxidizing atmospheres such as carbon dioxide. Further, an adjuvant metal selected from the group consisting of the alkali metals other than cesium must be used with such as in the case of a rimmed steel or ingot iron electrode free of deoxidizing elements, cesium alone will produce a spray. However, it has been found that commercially acceptable spray transfer welds cannot be produced by ferrous electrodes when a cesium compound alone is employed. It has also been found that spray transfer cannot be produced with a cesium compound alone on the wires that are used commercially for $CO_2$ shielded welding, particularly the highly deoxidized wires required for the welding of rimmed and semi-killed steels. Presumably this is a result of the wire chemistry itself. But when the same cesium compound is supplemented by another alkali metal compound as described heretofore, a good axial spray can be achieved with any suitable welding wire regardless of the alloying content. The explanation of this is not clear, but it is presumed that if the wire is high in elements such as silicon which have an affinity for oxygen, the formation or retention of cesium oxide at the proper location on the cathode is suppressed or decreased and the ability of the agent to produce spray transfer is diminished. Just why the addition of another alkali metal compound helps in overcoming the difficulties associated with producing spray transfer in a carbon dioxide shielding atmosphere in the presence of high silicon is not known, but the result has been clearly observed. Silicon is, of course, not the only element in the electrode wire that affects adversely the spray producing effect of cesium. Aluminum and titanium frequently incorporated as deoxidizing elements, produce similar adverse effects. Other deoxidizing or alloying elements in the wire probably also have more or less of an effect. The part played by the deoxidizing metals such as silicon is by far most important, however, because their effect nullifies the action of cesium unless an adjuvant compound is added with the cesium to inhibit or counteract the adverse effect of the deoxidizer. Further, such deoxidizers are almost always present in considerable amounts (i.e., more than 0.25%) in ferrous electrodes of the type used in most ferrous metal welding.

One possible explanation as to why the combination of a cesium compound and another alkali metal compound is more effective than the cesium compound alone, is that with such a combination a eutectic mixture or solution of alkali metal oxides is formed which has a lower melting temperature and a higher boiling temperature than either compound alone. It is believed that what is required is to form a mixture of the two alkali metal oxides which will melt at a low enough temperature to distribute itself evenly over the electrode surface as the electrode approaches the arc to form an annular zone or area spaced axially from the end of the electrode of increased electrical emissivity relative to the emissivity at the extreme tip of the electrode. The resultant increase in electrical emissivity, at or in the general region of the beginning of the electrode melting zone, causes the arc plasma to "climb" and "hook on" to the electrode at the said region with the result that the plasma then encompasses most, if not all, of the molten metal at the electrode tip and produces a distribution of electrical forces such that the molten metal is projected across the arc to the workpiece axially from the end of the electrode. The "climbing" of the plasma as just described probably will occur only when emission becomes "easier," or requires less voltage drop, at said zone removed from the electrode tip as compared with the emission at the extreme tip itself. Thus it is believed important to the success of the invention that the spray producing substance, or mixture of substances, be not only a very good emitter but also have a sufficiently low melting point and sufficiently high boiling or vaporization point to form and retain a uniform and sufficient area of emission surface at or adjacent to the beginning of the electrode melting zone. At the same time the spray producing agent should not remain on the electrode, or at least not so remain in its highly emissive form, until it reaches the extreme tip thereof because for the plasma to climb the relative overall voltage drops between the workpiece and said two respective cathode locations must be reversed in relative magnitude, or made at least approximately equal. It is believed that one of the unique properties of cesium, its unusually low ionization potential, contributes to this result. It would seem that any cesium vapor, resulting from the evaporation of cesium formed by partial dissociation of the cesium oxide on the cathode and/or dissociation of vaporized cesium compounds in the plasma, would lower the voltage drop in the $CO_2$ plasma, at least in the plasma space adjacent the said cathode emission zone, and thus would facilitate the climbing of the plasma to locations of higher emissivity or lower cathode voltage drop. Such effect on the plasma voltage drop is particularly significant with $CO_2$ shielding gas because the voltage drop in said gas is several times greater than the voltage drop in argon.

The fact that the alkali metal compounds generally, alkaline earth compounds and rare earth compounds will not produce in carbon dioxide shielding atmospheres the spray transfer that can be produced with cesium based agents when applied in accordance with the present invention may be due, at least in part, to the relatively high boiling points of the oxides of such metals. Whatever metal compound is added, the oxide thereof will, of course, be formed to some degree under the high temperature kinetic conditions of the arc in the presence of the free oxygen resulting from partial dissociation of the $CO_2$ shielding gas. Such alkaline earth and rare earth metal oxides, having relatively high boiling and dissociation temperatures, may stay on the molten cathode metal to the extreme tip of the electrode and thus may cause only an overall increase in cathode emissivity, rather than shifting the balance or relation between the emissivity of one cathode area compared to another cathode area. Further, such other metal oxides are not usually as good electron emitters as cesium-cesium oxide, nor do the metals thereof have the extremely low ionization potential of cesium.

Figure 6:
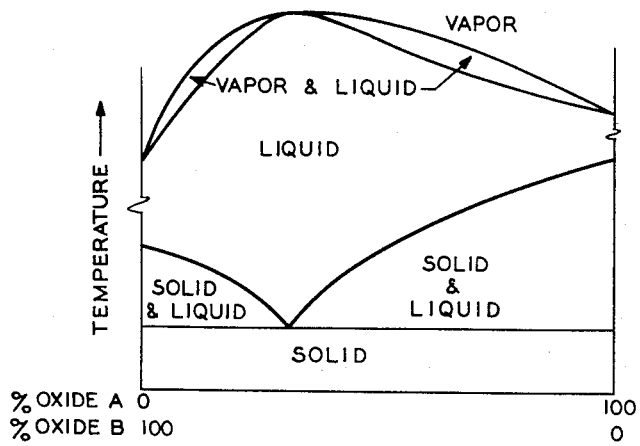
Figure 6 is a typical phase diagram for a binary system of oxides such as those believed present on the electrode in the present invention.

Typical variation of melting and boiling points that may be expected with changes in relative concentration of mixtures or solutions is illustrated in Figure 6. It will be noted that as the concentrations are varied from a limit of 100% of one oxide through the range of 100% of the other oxide the melting points drop in either direction, toward a minimum at the eutectic. Boiling points, on the other hand, increase in somewhat the same manner, so that the range between melting and boiling points is greater in the general vicinity of the eutectic concentrations.

Figure 7:
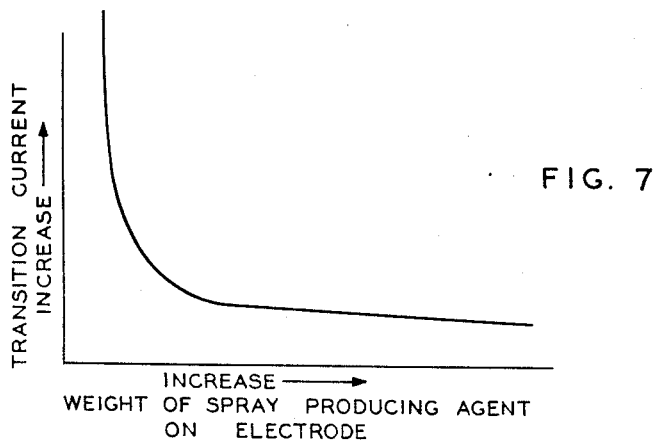
Figure 7 is a qualitative representation of the variations in the current level at which the transition from drop to spray transfer takes place as the quantity of spray producing agent applied to the wire is varied.

The amount of spray producing agent added to the electrode wire in accordance with the present invention is not particularly critical provided a certain minimum amount is added. For instance, with the wire processing method described in detail herein it has been found that a treated wire will contain, or bear, about 0.03% of the mixture of treating compounds. Figure 7 illustrates the variations in transition current as the quantity of spray producing agent added to the wire is increased. It will be noted that little change occurs after some minimum amount of Cs is added to the wire. This minimum amount may be different for each particular wire, but in practically all cases should be at least about 0.01% by weight. An amount of cesium containing spray producing agent in an amount equal to about 0.03% by weight of the wire has been found satisfactory for general application of the invention.

Some of the differences between the inert gas (argon) shielded metal arc and the $CO_2$ shielded metal arc can be observed visually, both with the naked eye through welding glasses and by use of the ultra-high speed motion pictures. Such differences are illustrated, in fairly accurate detail, in Figures 8 to 12. Further the visual differences between the $CO_2$ shielded welding arc of the prior art and the $CO_2$ shielded spray transfer arc of the present invention are illustrated respectively in Figure 11 and Figure 12.

Figure 8:
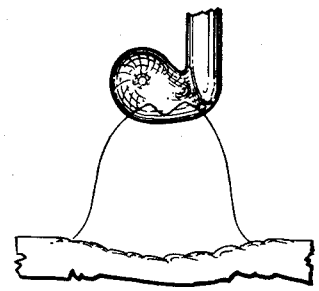
Figures 8, 9 and 10 illustrate three of the various forms of welding arcs that exist in argon shielded consumable electrode welding.

Argon shielded straight polarity metal arcs, as shown in Figure 8, emit almost entirely from the bottom of the molten drops, or from the extreme tip of the electrode. The emission area shifts from spot to spot and time to time over the cathode. Presumably, the cold cathode type of emission present in such an arc requires heavy ion bombardment of localized cathode areas in order to provide sufficiently high local temperatures to maintain the necessary emission to sustain the arc. The result is globular, spatter type transfer.

Figure 9:
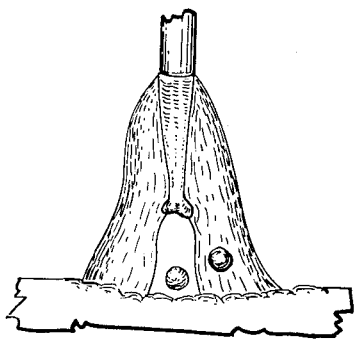

As an emissive agent is added to such an electrode, in the inert gas environment, emission begins to occur well back on the wire and the plasma shifts back and forth from the electrode tip to electrode side areas well to the rear of the molten metal zone, or takes place from both such areas simultaneously, and with such a partially activated electrode the spatter type transfer persists. Figure 9 shows this phenomena.

Figure 10:
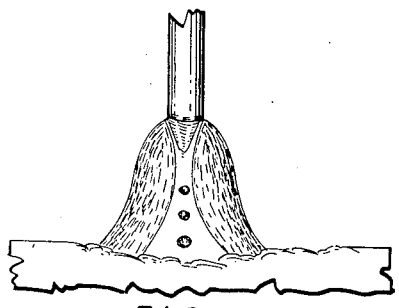

With a properly activated electrode in argon the cathode emission area can be concentrated from the condition shown in Figure 9 to substantially the same configuration which results from the use of reverse polarity high current density arcs in argon, as illustrated in Figure 10.

Figure 11:
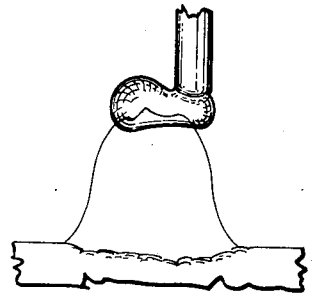
Figure 11 shows the form of welding arc found in the prior art types of carbon dioxide shielded consumable electrode welding arcs.

The reverse polarity $CO_2$ arc, on the other hand, has the globular, spatter transfer configuration shown in Figure 11, and so too does the straight polarity $CO_2$ arc. In fact, the erratic arc configuration of Figure 11 is fairly representative of all types of $CO_2$ shielded welding prior to the present invention.

Figure 12:
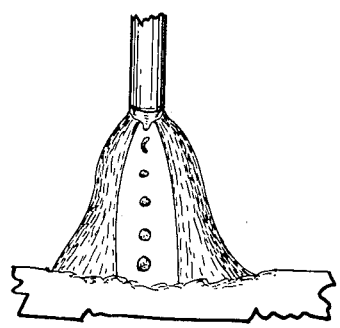
Figure 12 shows the form of welding arc created in carbon dioxide shielded consumable electrode arcs according to the present invention.

Figure 12 shows the arc plasma and axial spray transfer phenomena produced in $CO_2$ shielded straight polarity arcs by the process combination of the present invention. It should be noted that the condition represented in Figure 9 never exists in the $CO_2$ shielded arc. Except when formed as shown in Figure 12 by the process combination of the present invention, the $CO_2$ shielded arc always is of the erratic, spatter transfer type regardless of whether or not it be reverse polarity, straight polarity, or formed by wires treated with agents such as alkaline earth compounds and rare earth compounds.

Control of the emission area on the electrode appears to be essential to the production of spray transfer. This can be accomplished in $CO_2$ atmospheres by the present invention through special treatment of the electrode. This control can only be exercised when operating with straight polarity, i.e., the electrode negative.

Phrases such as "$CO_2$ atmosphere" or "carbon dioxide shielded" as used herein should, of course, be considered to include oxidizing atmospheres composed predominantly of carbon dioxide and in which carbon dioxide is present in an amount sufficient to provide arc properties and shielding properties characteristic of carbon dioxide. While the foregoing disclosure refers to the mixture of a cesium compound and an adjuvant alkali metal compound it is to be understood that three or more compounds may be mixed as long as the mixture is capable of supplying the necessary cesium and adjuvant metal to the cathode in a manner to promote the production of spray transfer. In any such mixture, the proportions should be such that the combined number of atoms of alkali metals other than cesium equal the number of cesium atoms present. It is also to be understood that while the invention is primarily applicable to the field of arc welding and has been disclosed herein with reference to that use, it is contemplated that it will find utility in related arts such as arc cutting.

While only a certain limited number of embodiments have been described herein, the invention is not limited to the particular forms disclosed but may be used in other ways without departure from its spirit as defined by the following claims.

We claim:

1. In a gas shielded metal arc welding process in which a direct current straight polarity arc is maintained between a consuming ferrous metal wire electrode and a workpiece, and the arc end of said electrode, said arc and the weld puddle formed by said arc are shielded from the ambient atmosphere by a flowing stream of carbon dioxide gas, the improvement which comprises supplying to the arc end of said electrode a cesium compound and an adjuvant material which acts in the arc region with said cesium compound to cause the metal transferred across said arc from said electrode to said workpiece to be transferred in the form of an axially projected spray of metal droplets.

2. In a process for gas shielded arc working of metals wherein a ferrous electrode wire having an electrically conductive surface is continuously consumed by a carbon dioxide shielded arc maintained by direct current continuously supplied to said wire electrode through its conductive surface at a location adjacent the arc end thereof, the improvement which comprises operating said arc as a straight polarity arc and continuously introducing into said arc as said wire electrode is consumed thereby cesium and an alkali metal other than cesium to cause the transfer of metal from said electrode end to be in the form of an axially projected spray of molten droplets.

3. A process for gas shielded direct current electric arc welding in which a welding arc formed between a consuming ferrous electrode and a workpiece is shielded from the ambient air by carbon dioxide, characterized by making said electrode the arc cathode and delivering to said cathode as an addition to said electrode a compound of cesium and a compound of an alkali metal other than cesium.

4. A process for gas shielded direct current electric arc welding in which a welding arc formed between a consuming ferrous electrode and workpiece is shielded from the ambient air by carbon dioxide, characterized by making said electrode the arc cathode and delivering to said cathode as an addition to said electrode a compound of cesium and a compound of a metal selected from the group consisting of sodium potassium.

5. A process for gas shielded direct current electric arc welding in which a welding arc formed between a consuming ferrous electrode and a workpiece is shielded from the ambient air by carbon dioxide, characterized by making said electrode the arc cathode and delivering cesium carbonate and sodium carbonate to said cathode as an addition to said electrode.

6. A process for gas shielded direct current electric arc welding in which a welding arc formed between a consuming ferrous electrode and a workpiece is shielded from the ambient air by carbon dioxide, characterized by making said electrode the arc cathode and delivering cesium carbonate and potassium carbonate to said cathode as an addition to said electrode.

7. A process for gas shielded direct current electric arc welding in which a welding arc formed between a consuming ferrous electrode and a workpiece is shielded from the ambient air by carbon dioxide, characterized by making said electrode the arc cathode and delivering cesium hydroxide and sodium hydroxide to said cathode as an addition to said electrode.

8. A process for gas shielded direct current electric arc welding in which a welding arc formed between a consuming ferrous electrode and a workpiece is shielded from the ambient air by carbon dioxide, characterized by making said electrode the arc cathode and delivering cesium hydroxide and potassium hydroxide to said cathode as an addition to said electrode.

9. A process for gas shielded direct current electric arc welding in which a welding arc formed between a consuming ferrous electrode and a workpiece is shielded from the ambient air by carbon dioxide, characterized by making said electrode the arc cathode and delivering cesium nitrate and sodium nitrate to said cathode as an addition to said electrode.

10. A method of producing spray transfer from a consuming ferrous arc welding electrode containing residual deoxidizing agents when used in a carbon dioxide shielding atmosphere which comprises the steps of operating said electrode as a cathode of a direct current welding arc and supplying to said cathode as an addition to the surface of said electrode a cesium compound and a compound of an alkali metal other than cesium.

11. The method of electric arc welding which comprises supplying direct current at straight polarity to an arc formed between a ferrous wire electrode and a workpiece, feeding said wire toward said workpiece to maintain said arc as metal is transferred from said electrode to said workpiece, shielding the arc end of said electrode, said arc, and the weld pool formed thereby with carbon dioxide, and supplying a cesium compound and a compound of an alkali metal other than cesium to the arc end of said electrode in a proportion such that said alkali metal other than cesium is present, by weight, in an amount equal to not less than one-fifth and not more than five times the weight of said cesium present multiplied by a factor equal to the atomic weight of said other alkali metal divided by the atomic weight of said cesium.

12. The method of electric arc welding which comprises supplying direct current at straight polarity to an arc formed between a ferrous wire electrode and a workpiece, feeding said wire toward said workpiece to maintain said arc as metal is transferred from said electrode to said workpiece, shielding the arc end of said electrode, said arc, and the weld pool formed thereby with carbon dioxide, and supplying a cesium compound and a compound of an alkali metal other than cesium to the arc end of said electrode in a proportion such that the weight of cesium and the weight of alkali metal other than cesium present are in substantially the proportion of the respective atomic weights of said metals.

13. The method of electric arc welding which comprises supplying direct current at straight polarity to an arc formed between a ferrous wire electrode and a workpiece, feeding said wire toward said workpiece to maintain said arc as metal is transferred from said electrode to said workpiece, shielding the arc end of said electrode, said arc, and the weld pool formed thereby with carbon dioxide, and supplying a spray producing agent comprising a cesium compound and a compound of an alkali metal other than cesium to the arc end of said electrode in an amount exceeding 0.03% of the total electrode weight.

14. A method of electric arc welding on a workpiece of rimmed steel or semi-killed steel comprising striking an arc between a welding wire and said workpiece in a region adjacent to the area of said workpiece to be welded, continuously feeding the wire to said area to be welded, depositing melted welding wire in said area, and delivering approximately 100 percent carbon dioxide adjacent the arc, said wire being constituted of iron alloyed with at least 0.25% by weight of manganese and at least 0.25% by weight of a strongly reducing metal, and having an addition thereto of a spray producing agent consisting of a compound of cesium and a compound of an alkali metal other than cesium.

15. A consumable bare arc welding electrode the surface of which is electrically conductive for receiving welding current from a current supply means, said electrode comprising a deoxidized ferrous wire a spray producing agent which consists essentially of a cesium compound and a compound of an alkali metal other than cesium, said wire containing residual deoxidizing elements in an amount sufficient for the carbon dioxide shielded straight polarity spray arc welding of semi-killed ferrous workpieces.

16. A method of producing non-porous weld deposits with a carbon dioxide shielded spray transfer metal arc comprising, establishing a straight polarity welding arc between a workpiece and a cesium bearing ferrous metal consumable electrode containing more than .25% by weight manganese and more than .25% by weight of a deoxidizing metal, adding to the cathode of said arc an adjuvant metal which enables said cesium to act as a spray transfer agent in said carbon dioxide atmosphere in the presence of said deoxidizing metal, and supplying said welding current at a current density sufficient to cause the electrode metal to be transferred across the arc to the workpiece in the form of an axial spray within said carbon dioxide shield.

17. A ferrous electrode for gas shielded metal arc welding and cutting in a carbon dioxide shielding atmosphere comprising, a ferrous wire containing more than .25% by weight manganese and more than .25% by weight of a deoxidizing metal selected from the group consisting of silicon, aluminum and titanium, said electrode having on the surface thereof a superficial coating of a spray transfer producing agent composed of a mixture of alkali metal compounds containing cesium in an amount which is at least about .01% by weight of the wire and containing an alkali metal other than cesium in an amount which is at least about 20% by weight of said cesium.

18. An electrode according to claim 15 in which the cesium compound is a compound selected from the group consisting of cesium hydroxide, cesium carbonate, and cesium nitrate.

19. An electrode according to claim 15 in which the alkali metal other than cesium is a metal selected from the group consisting of sodium and potassium.

References Cited in the file of this patent

UNITED STATES PATENTS

| | | |
|---|---|---|
| 2,694,764 | Muller | Nov. 16, 1954 |
| 2,843,727 | Benz et al. | July 15, 1958 |

FOREIGN PATENTS

| | | |
|---|---|---|
| 626,481 | France | May 14, 1927 |
| 1,094,722 | France | Dec. 8, 1954 |

UNITED STATES PATENT OFFICE

CERTIFICATE OF CORRECTION

Patent No. 2,932,722                              April 12, 1960

Alexander Lesnewich et al.

It is hereby certified that error appears in the printed specification of the above numbered patent requiring correction and that the said Letters Patent should read as corrected below.

Column 2, line 51, for "to" read -- and --; columns 5 and 6, Table I, seventh column thereof, last item, for "230" read -- 130 --; column 6, line 65, for "CoOH" read -- CsOH --; columns 7 and 8, Table II, first column thereof, last item, for "CsOH+NaCO$_3$" read -- CsOH+Na$_2$CO$_3$ --; column 11, line 64, after "sodium" insert -- and --.

Signed and sealed this 20th day of September 1960.

(SEAL)
Attest:

KARL H. AXLINE
Attesting Officer

ROBERT C. WATSON
Commissioner of Patents